(12) United States Patent
Honma et al.

(10) Patent No.: US 10,351,719 B2
(45) Date of Patent: Jul. 16, 2019

(54) PHOTO-CURABLE INK, INK CARTRIDGE, AND IMAGE FORMING METHOD

(71) Applicant: CANON KABUSHIKI KAISHA, Tokyo (JP)

(72) Inventors: Takeshi Honma, Tokyo (JP); Motokazu Kobayashi, Yokohama (JP); Yoshinori Kotani, Yokohama (JP); Kenichi Iida, Kawasaki (JP); Shiori Yonezawa, Tokyo (JP); Kazumi Iwashita, Kobe (JP); Kaori Kawa, Handa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/749,349

(22) PCT Filed: Jul. 29, 2016

(86) PCT No.: PCT/JP2016/003518
§ 371 (c)(1),
(2) Date: Jan. 31, 2018

(87) PCT Pub. No.: WO2017/026102
PCT Pub. Date: Feb. 16, 2017

(65) Prior Publication Data
US 2018/0208784 A1    Jul. 26, 2018

(30) Foreign Application Priority Data

Aug. 7, 2015 (JP) ................................. 2015-157642
May 31, 2016 (JP) ................................. 2016-109451
Jul. 23, 2016 (JP) ................................. 2016-144983

(51) Int. Cl.
*C09D 11/101* (2014.01)
*C09D 11/023* (2014.01)
(Continued)

(52) U.S. Cl.
CPC ......... *C09D 11/101* (2013.01); *B41J 2/17503* (2013.01); *B41J 2/17513* (2013.01);
(Continued)

(58) Field of Classification Search
CPC .......................... C09D 11/101; B41J 2/17503
(Continued)

(56) References Cited

U.S. PATENT DOCUMENTS 4,358,476 A    11/1982   Zimmer
6,787,583 B2 *  9/2004   Veya ................... C09D 11/101
                                                           101/150
(Continued)

FOREIGN PATENT DOCUMENTS

DE     102015217553 A1    3/2016
EP        0338791 A2    10/1989
(Continued)

*Primary Examiner* — An H Do
(74) *Attorney, Agent, or Firm* — Canon U.S.A. Inc., IP Division

(57) ABSTRACT

A photo-curable ink contains an oil-based liquid containing a polymerizable compound and a photopolymerization initiator, and an aqueous liquid containing water. When the photo-curable ink is stirred at a rotational speed of 15000 rpm or more for 3 minutes and then allowed to stand at 25° C. for one hour or more, droplets formed with the aqueous liquid are dispersed in the oil-based liquid without layer separation between the oil-based liquid and the aqueous liquid.

18 Claims, 3 Drawing Sheets

(51) Int. Cl.
*B41J 2/175* (2006.01)
*C09D 11/03* (2014.01)
*C01G 23/047* (2006.01)
*C09D 11/037* (2014.01)
*C09D 11/106* (2014.01)

(52) U.S. Cl.
CPC .......... *C01G 23/047* (2013.01); *C09D 11/023* (2013.01); *C09D 11/03* (2013.01); *C09D 11/037* (2013.01); *C09D 11/106* (2013.01); *C01P 2004/64* (2013.01)

(58) Field of Classification Search
USPC .......................................... 347/95, 100, 102
See application file for complete search history.

(56) References Cited

U.S. PATENT DOCUMENTS

| | | | |
|---|---|---|---|
| 7,893,127 B2* | 2/2011 | Nagvekar | C09D 4/00 522/120 |
| 9,056,999 B2* | 6/2015 | Yamashita | C09D 11/38 |
| 2007/0197384 A1 | 8/2007 | Yan | |
| 2015/0184004 A1 | 7/2015 | Jung | |
| 2017/0287695 A1* | 10/2017 | Ito | C08F 2/44 |

FOREIGN PATENT DOCUMENTS

| | | |
|---|---|---|
| JP | 2001-181541 A | 7/2001 |
| JP | 2005-298757 A | 10/2005 |
| JP | 3766982 B2 | 4/2006 |
| JP | 2006-297719 A | 11/2006 |
| JP | 2007-314801 A | 12/2007 |

* cited by examiner

PHOTO-CURABLE INK, INK CARTRIDGE, AND IMAGE FORMING METHOD

CROSS-REFERENCE TO RELATED APPLICATIONS

This application is a National Stage filing of International Application No. PCT/JP2016/003518 filed Jul. 29, 2016, which claims the benefit of Japanese Patent Application No. 2015-157642, filed Aug. 7, 2015, No. 2016-109451, filed May 31, 2016, and No. 2016-144983, filed Jul. 23, 2016, which are hereby incorporated by reference herein in their entirety.

TECHNICAL FIELD

The present invention relates to a photo-curable ink, an ink cartridge, and an image forming method.

BACKGROUND ART

The recent commercial print market has had a strong demand for a technique for forming images on a recording medium (substrate) other than white media, such as a transparent or translucent film or a colored paper sheet. On these recording media other than white media, white images are often formed.

PTL 1 discloses a photo-curable ink as an ink adapted to form white images. This ink contains a polymerizable compound and a solvent having a low boiling point (hereinafter referred to as low-boiling-point solvent). When this photo-curable ink is cured, the low-boiling-point solvent is volatilized. Consequently, the cured film of the photo-curable ink has many pores therein and is thus porous. The pores scatter light, so that the cured film appears to be white.

CITATION LIST

Patent Literature

PTL 1: Japanese Patent Laid-Open No. 2005-298757

SUMMARY OF INVENTION

Technical Problem

In the ink of PTL 1, however, the low-boiling-point solvent and the polymerizable compound are mixed and dissolved in each other. Accordingly, the pores to be formed in the cured film are likely to be very small. The whiteness of the resulting cured film of the ink of PTL 1 is therefore insufficient. PTL 1 also discloses an ink containing water as the low-boiling-point solvent. Unfortunately, this ink is divided into two layers, a water layer and an oil layer, when some time has passed after mixing the constituents of the ink, and is thus inferior in storage stability.

Accordingly, the present invention provides a photo-curable ink superior in storage stability to the known ink and capable of forming white images having a high whiteness.

Solution to Problem

According to an aspect of the present invention, there is provided a photo-curable ink containing an oil-based liquid containing a polymerizable compound and a photopolymerization initiator, and an aqueous liquid containing water. When the photo-curable ink is stirred at a rotational speed of 15000 rpm or more for 3 minutes and then allowed to stand at 25° C. for one hour or more, droplets formed with the aqueous liquid are dispersed in the oil-based liquid without layer separation between the oil-based liquid and the aqueous liquid.

Further features of the present invention will become apparent from the following description of exemplary embodiments with reference to the attached drawings.

DESCRIPTION OF EMBODIMENTS

Figure 1A:
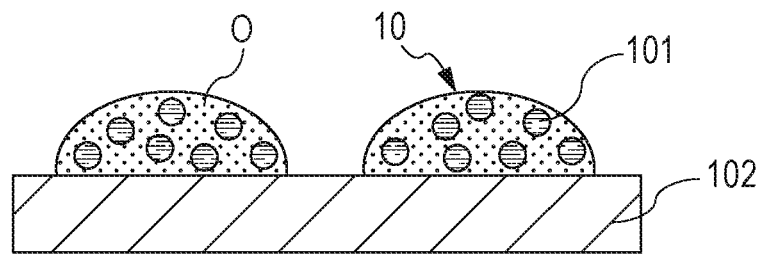
FIG. 1A is a schematic illustrative representation of an image forming method using a photo-curable ink according to an embodiment of the present invention.

Embodiments of the present invention will now be described in detail. The present invention is not limited to the following embodiments and includes any modification or change that can be made within the scope and spirit of the invention on the basis of the knowledge of those skilled in the art.

A photo-curable ink 10 (hereinafter referred to as the ink 10) according to an embodiment of the present invention contains an oil-based liquid (O) containing a polymerizable compound (A) and a photopolymerization initiator (B), and an aqueous liquid (W) containing water (C). When the ink 10 is stirred at a rotational speed of 15000 rpm or more for 3 minutes and then allowed to stand at 25° C. for one hour or more, droplets 101 of the aqueous liquid (W) are dispersed in the oil-based liquid (O) without being aggregated by layer separation between the oil-based liquid (O) and the aqueous liquid (W).

An ink mentioned herein refers to a flowable composition in the form of liquid, gel, or the like, used for forming a film on a substrate or coloring the inside or the surface of the substrate by being applied to the substrate. Hence, the "ink" mentioned herein does not necessarily contain a dye or a pigment and may be colorless before being applied to a substrate.

The ink 10 is particularly suitable to form a white image by being applied to a substrate by an ink jet method and cured by irradiation with light. When a coating of the ink 10 is cured into an ink film 106 (hereinafter simply referred to as the film 106 in some cases), the film 106 has many pores therein. Thus, a white image having a high whiteness is formed. This is probably because the water (C) in the ink 10 is evaporated while the ink 10 is being cured and/or after the ink 10 has been cured. Thus, pores are formed in the positions where the water (C) has been present.

The constituents of the ink 10 will be described in detail below.

Oil-Based Liquid (O)

The oil-based liquid (O) in the ink 10 is a hydrophobic liquid. The oil-based liquid (O) is desirably a photo-curable liquid that is cured by being irradiated with an active energy radiation such as ultraviolet light.

The oil-based liquid (O) contains a polymerizable compound (A) and a photopolymerization initiator (B). The polymerizable compound (A) is a compound having a polymerizable functional group and may be a monomer, an oligomer, a polymer, or a mixture of two or more of these polymerizable compounds. If a solid polymerizable compound is used, it is desirable to mix and dissolve the solid polymerizable compound in a liquid polymerizable compound.

The oil-based liquid (O) is not compatible with the aqueous liquid (W) described later. Since the oil-based liquid (O) and the aqueous liquid (W) are not compatible, an interface is formed between the oil-based liquid (O) and the aqueous liquid (W). Thus, droplets 101 of the aqueous liquid (W) are formed. By controlling, for example, the size and dispersion of the droplets 101, the size of the pores 105 in the cured film 106 of the ink 10 can be controlled, and thus the whiteness of the film 106 can be increased.

Polymerizable Compound (A)

The polymerizable compound (A) contained in the oil-based liquid (O) in the ink 10 reacts with a polymerizing factor, such as radicals, produced from a photopolymerization initiator (B) described later, thus forming a polymer film by a chain reaction (polymerization reaction).

The polymerizable compound (A) may be composed of a single polymerizable compound or a combination of a plurality of polymerizable compounds.

The polymerizable compound (A) may be a radically polymerizable compound. The radically polymerizable compound may have one or more acryloyl group or methacryloyl group, and hence may be a (meth)acrylic compound.

Examples of the monofunctional (meth)acrylic compound having one acryloyl group or methacryloyl group include, but are not limited to, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate. EO-modified p-cumylphenol (meth)acrylate, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, polyoxyethylene nonylphenyl ether (meth)acrylate, isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, 1-naphthylmethyl (meth)acrylate, 2-naphthylmethyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone(meth)acrylamide, isobutoxymethyl(meth)acrylamide, N,N-dimethyl(meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, and N,N-dimethylaminopropyl(meth)acrylamide.

Some monofunctional (meth)acrylic compounds are commercially available, and examples thereof include, but are not limited to, Aronix (registered trademark) series M101, M102, M110, M111, M113, M117, M5700, TO-1317, M120, M150, and M156 (each produced by Toagosei); MEDOL 10, MIBDOL 10, CHDOL 10, MMDOL 30, MEDOL 30, MIBDOL 30. CHDOL 30, LA, IBXA, 2-MTA, and HPA and Biscoat series #150, #155, #158, #190, #192, #193, #220, #2000, #2100, and #2150 (each produced by Osaka Organic Chemical Industry); Light Acrylates BO-A. EC-A, DMPA, THF-A, HOP-A, HOA-MPE, HOA-MPL, PO-A, P-200A. NP-4EA. and NP-8EA, and epoxy ester M-600A (each produced by Kyoeisha Chemical); KAYARAD TC110S, R-564, and R-128H (each produced by Nippon Kayaku); NK esters AMP-10G and AMP-20G (each produced by Shin-Nakamura Chemical); FA-511A, 512A, and 513A (each produced by Hitachi Chemical); PHE, CEA, PHE-2, PHE-4, BR-31, BR-31 M, and BR-32 (each produced by Dai-ichi Kogyo Seiyaku); VP (produced by BASF); and ACMO, DMAA, and DMAPAA (each produced by Kohjin).

Examples of the polyfunctional (meth)acrylic compound having two or more acryloyl or methacryloyl groups include, but are not limited to, trimethylolpropane di(meth)acrylate, trimethylolpropane tri(meth)acrylate, EO-modified trimethylolpropane tri(meth)acrylate, PO-modified trimethylolpropane tri(meth)acrylate, EO, PO-modified trimethylolpropane tri(meth)acrylate, dimethyloltricyclodecane diacrylate, pentaerythritol tri(meth)acrylate, pentaerythritol tetra(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, 1,3-adamantanedimethanol diacrylate, o-xylene di(meth)acrylate, m-xylene di(meth)acrylate, p-xylene di(meth)acrylate, 1,9-nonanediol diacrylate, 1,10-decanediol diacrylate, tris(2-hydroxyethyl)isocyanurate tri(meth)acrylate, tris(acryloyloxy)isocyanurate, bis(hydroxymethyl)tricyclodecane di(meth)acrylate, dipentaerythritol penta(meth)acrylate, dipentaerythritol hexa(meth)acrylate, EO-modified 2,2-bis(4-((meth)acryloxy)phenyl)propane, PO-modified 2,2-bis(4-((meth)acryloxy)phenyl)propane, and EO, PO-modified 2,2-bis(4-((meth)acryloxy)phenyl)propane.

Some polyfunctional (meth)acrylic compounds are commercially available, and example thereof include, but are not limited to, Yupimer (registered trademark) series UV SA1002 and UV SA2007 (each produced by Mitsubishi Chemical); Biscoat series #195, #230, #215, #260, #335HP, #295, #300, #360, #700, GPT, and 3PA (each produced by Osaka Organic Chemical Industry); Light Acrylates 4EG-A, 9EG-A, NP-A, DCP-A, BP-4EA, BP-4PA, TMP-A, PE-3A, PE-4A, and DPE-6A (each produce by Kyoeisha Chemical); A-DCP, A-HD-N. A-NOD-N, and A-DOD-N (each produced by Shin-Nakamura Chemical); KAYARAD PET-30, TMPTA, R-604, DPHA, DPCA-20, DPCA-30, DPCA-60, DPCA-120, HX-620, D-310, and D-330 (each produced by Nippon Kayaku); Aronix series M208, M210, M215, M220, M240, M305, M309, M310, M315, M325 and M400 (each produced by Toagosei); and Ripoxy (registered trademark) series VR-77, VR-60, and VR-90 (each produced by Showa Denko).

In the above citation of compounds, (meth)acrylate refers to an acrylate or the methacrylate containing the same alcohol residue as the acrylate. Also, a (meth)acryloyl group refers to the acryloyl group or the methacryloyl group containing the same alcohol residue as the acryloyl. EO represents ethylene oxide, and EO-modified compound A is a compound in which the (meth)acrylic acid residue and the alcohol residue of compound A are bound to each other with an ethylene oxide block structure therebetween. PO represents propylene oxide, and PO-modified compound B is a compound in which the (meth)acrylic acid residue and the alcohol residue of compound B are bound to each other with a propylene oxide block structure therebetween.

Advantageously, the (meth)acrylic compound, or polymerizable compound (A), does not much dissolve water. More specifically, the solubility of water in 100% by mass of (meth)acrylic compound at 25° C. is desirably in the range of 0.01% by mass to 2.0% by mass. The same applies to the case in which the polymerizable compound (A) contains a plurality of (meth)acrylic compounds; hence, it is advantageous that a mixture of (meth)acrylic compounds that is the polymerizable compound (A) do not much dissolve water. More specifically, the solubility of water in 100% by mass of a mixture of (meth)acrylic compounds at 25° C. is desirably in the range of 0.01% by mass to 2.0% by mass.

The use as the polymerizable compound (A) of a (meth)acrylic compound that does not much dissolve water can reduce the dissolution of water (C) contained in the droplets 101 of the aqueous liquid (W) in the polymerizable compound (A) in the oil-based liquid (O). Thus, the water (C) in the aqueous liquid (W) in the ink 10 is prevented from migrating through the (meth)acrylic compound, or polymerizable compound (A). Consequently, the droplets 101 can be kept a desired size. In other words, the stability of the droplets 101 of the aqueous liquid (W) can be improved in the ink 10. By improving the stability of droplets 101 in the ink 10, white images having a high whiteness can be formed with the ink 10 even if the ink 10 has been stored for a long time. In particular, by controlling the solubility of water to 2.0% by mass or lower, the droplets 101 can be kept a desired size. If the size of the droplets 101 is increased, the viscosity of the ink 10 decreases and other physical properties vary. By improving the stability of the droplets 101, the physical properties of the ink 10, including the viscosity, can be maintained. In this connection, even though an additive other than water (C) is added as will be described later, the solubility of water in the (meth)acrylic compound or polymerizable compound (A) at 25° C. does not vary. Even if an additive is added, the stability in size of the droplets 101 can be improved by controlling the solubility of water in the above range.

The solubility of water in the (meth)acrylic compound or polymerizable compound (A) at 25° C. can be measured with a Karl Fischer moisture meter. For example, the solubility of water is measured as described in "Measurement of Solubility of Water in (Meth)acrylic Compound at 25° C." in Examples.

Desirably, the content of the polymerizable compound (A) in the oil-based liquid (O) is in the range of 70% by mass to 99.99% by mass relative to the total mass of the oil-based liquid (O). More desirably, it is in the range of 80% by mass to 99.9% by mass, such as 90% by mass to 99% by mass.

By controlling the content of the polymerizable compound (A) in the oil-based liquid (O) to 70% by mass or more relative to the total mass of the oil-based liquid (O), the mechanical strength of the resulting film 106 can be increased. Also, when the content of the polymerizable compound (A) is 99.99% by mass or less relative to the total mass of the oil-based liquid (O), the ink 10 can be cured in a shorter time and is thus superior in reaction efficiency.

Photopolymerization Initiator (B)

The photopolymerization initiator (B) in the ink 10 senses light in a specific wavelength range to produce a polymerizing factor (for example, radicals). More specifically, the photopolymerization initiator (B) is a polymerization initiator that generates a polymerizing factor with light (infrared radiation, visible light, ultraviolet radiation, far ultraviolet radiation, X-ray radiation, charged particle radiation such as electron beams, or any other radiation). For example, the photopolymerization initiator (B) may generate a polymerizing factor with light, for example, in a wavelength range of 150 nm to 400 nm.

The photopolymerization initiator (B) may be composed of a single photopolymerization initiator or a combination of a plurality of photopolymerization initiators.

The photopolymerization initiator (B) may be a radical generator. Examples of the radical generator include, but are not limited to, substituted or unsubstituted 2,4,5-triarylimidazole dimers, such as 2-(o-chlorophenyl)-4,5-diphenylimidazole dimer, 2-(o-chlorophenyl)-4,5-di(methoxyphenyl) imidazole dimer, 2-(o-fluorophenyl)-4,5-diphenylimidazole dimer, and 2-(o- or p-methoxyphenyl)-4,5-diphenylimidazole dimer; benzophenone and benzophenone derivatives, such as N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenone, 4,4'-dimethoxybenzophenone, and 4,4'-diaminobenzophenone; α-aminoaromatic ketone derivatives, such as 2-benzyl-2-dimethylamino-1-(4-morpholinophenyl)-butanone-1 and 2-methyl-1-[4-(methylthio)phenyl]-2-morpholino-propane-1-one; quinones, such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, and 2,3-dimethylanthraquinone; benzoin ether derivatives, such as benzoin methyl ether, benzoin ethyl ether, and benzoin phenyl ether; benzoin and benzoin derivatives, such as methylbenzoin, ethylbenzoin, and propylbenzoin; benzyl derivatives such as benzyl dimethyl ketal; acridine derivatives, such as 9-phenylacridine and 1,7-bis(9,9'-acridinyl)heptane; N-phenylglycine and N-phenylglycine derivatives; acetophenone and acetophenone derivatives, such as 3-methylacetophenone, acetophenone benzyl ketal, 1-hydroxycyclohexyl phenyl ketone, and 2,2-dimethoxy-2-phenylacetophenone; thioxanthone and thioxanthone derivatives, such as diethylthioxanthone, 2-isopropylthioxanthone, and 2-chlorothioxanthone; acylphosphine oxide derivatives, such as 2,4,6-trimethylbenzoyldiphenylphosphine oxide, bis(2,4,6-trimethylbenzoyl)phenylphosphine oxide, and bis(2,6-dimethoxybenzoyl)-2,4,4-trimethylpentylphosphine oxide; oxime ester derivatives, such as 1,2-octanedione, 1-[4-(phenylthio)phenyl-,2-(o-benzoyloxime)], and ethanone, 1-[9-ethyl-6-(2-methylbenzoyl)-9H-carbazol-3-yl]-, 1-(O-acetyloxime); and xanthone, fluorenone, benzaldehyde, fluorene, anthraquinone, triphenylamine, carbazole, 1-(4-isopropylphenyl)-2-hydroxy-2-methylpropane-1-one, and 2-hydroxy-2-methyl-1-phenylpropane-1-one.

Some radical generators are commercially available, and examples thereof include, but are not limited to, Irgacure series 184, 369, 651, 500, 819, 907, 784, and 2959, CGI-1700, CGI-1750, CGI-1850, CG24-61, Darocur (registered trademark) 1173, Lucirin (registered trademark) TPO, LR 8893, and LR 8970 (each produced by BASF); and Ubecryl P36 (produced by UCB).

Desirably, the content of the photopolymerization initiator (B) in the oil-based liquid (O) is in the range of 0.01% by mass to 15% by mass, more desirably in the range of 0.1% by mass to 10% by mass, relative to the total mass of the oil-based liquid (O).

When the content of the photopolymerization initiator (B) is 0.01% by mass or more relative to the total mass of the oil-based liquid (O), the ink 10 can be cured in a shorter time and is thus superior in reaction efficiency. Also, by controlling the content of the photopolymerization initiator (B) in the oil-based liquid (O) to 15% by mass or less relative to the total mass of the oil-based liquid (O), the mechanical strength of the resulting film 106 can be increased.

Other Constituents of Oil-Based Liquid (O)

The oil-based liquid (O) may further contain hydrophobic constituents other than the polymerizable compound (A) and photopolymerization initiator (B) according to the purpose of use within a range in which the intended effects of the present invention are produced. Such constituents include an antioxidant, a polymer component, and a polymerization inhibitor.

Aqueous Liquid (W)

The aqueous liquid (O) in the ink 10 is hydrophilic. The aqueous liquid (W) contains water (C). The aqueous liquid (W) is not compatible with the oil-based liquid (O).

The aqueous liquid (W) is formed into droplets 101 and dispersed in the oil-based liquid (O). When the ink 10 is cured, the aqueous liquid (W) is evaporated from the cured film 106. Thus, spaces are formed in the positions where the droplets 101 have been present. These spaces are pores 105. The pores 105 scatters incoming light. Consequently, the film 106 of the ink 10 appears to be white.

Desirably, the aqueous liquid (W) is in the form of emulsion in which the droplets 101 of the aqueous liquid (W) are dispersed in the oil-based liquid (O). Hence, it is desirable that the ink 10 be what is called an oil-in-water (O/W) emulsion. When the ink 10 is in the form of such an emulsion, the particle size and dispersibility of the droplets 101 of the aqueous liquid (W) can be kept stable. Thus, the ink 10 in such a state can be stably stored.

A phrase, for example, "a first liquid is formed into droplets and dispersed in a second liquid" mentioned herein" implies that the first liquid forms closed interfaces with the second liquid and is thus present in the form of particles in the second liquid. In this definition, the size (diameter) of the particles is 1 nm or more, and such a particle is referred to as a "droplet". If the size of the particles is less than 1 nm, the interfaces between the first liquid and the second liquid cannot be recognized. In this state, the first liquid and the second liquid are considered to be mixed and dissolved in each other in a solution.

Even if the ink 10 is allowed to stand at 25° C. for a certain period or more, the droplets 101 of the aqueous liquid (W) are dispersed in the oil-based liquid (O) without being aggregated by layer separation between the oil-based liquid (O) and the aqueous liquid (W). In general, when a liquid containing an oil-based liquid and an aqueous liquid is stored in a container for a long time, the oil-based liquid and the aqueous liquid form their respective phases and separate in such a manner that one layer is disposed on the other. In the description disclosed herein, the phenomenon in which two components separate into two layers is referred to as "layer separation".

In the ink 10, the oil-based liquid (O) and the aqueous liquid (W) do not layer-separate even if the ink 10 is stirred at a rotational speed of 15000 rpm or more for 3 minutes and then allowed to stand at 25° C. for one hour. Desirably, the oil-based liquid (O) and the aqueous liquid (W) do not layer-separate even after 24 hour standing, more desirably even after one week standing. It is assumed that as the rotational speed for stirring the ink is increased, the ink takes a longer time to layer-separate. If the oil-based liquid (O) and the aqueous liquid (W) did not layer-separate when the ink 10 has been stirred at a rotational speed of 2000 rpm or 3000 rpm for 3 minutes and then allowed to stand at 25° C. for one hour, therefore, it is expected that layer separation will not occur when the ink is stirred at 15000 rpm.

It can be examined in accordance with the following procedure whether or not layer separation will occur after stirring and mixing. First, an ink to be examined is placed in a bottle (20 mL) and then stirred with a homogenizer (AHG-160D, manufactured by AS ONE Corporation) at a rotational speed of 15000 rpm or more for 3 minutes. For this operation, it is advantageous to use a shaft generator HT1008 manufactured by AS ONE Corporation. Then, the stirred ink is transferred into a shaded sample tube and allowed to stand at 25° C. The ink is thus observed at regular intervals.

As described above, the water (C) in the ink 10 is evaporated while the ink 10 is being cured and/or after the ink 10 has been cured and thus forms pores in the positions where the water (C) has been present. The ink 10 thus forms a porous film 106. At this time, if many pores of 0.1 μm to 20 μm in diameter are present in the film 106, the pores can efficiently scatter incoming light. Consequently, the film 106 can exhibit a high whiteness. The pore size of the film 106 is desirably in the range of 0.1 μm to 1 μm, more desirably in the range of 0.2 μm to 0.5 μm. If the pore size of the film 106 is larger than 20 μm, the opacity of the film 106 may be degraded.

The pore size after the ink 10 has been cured depends on the particle size of the droplets 101 in the ink 10. The present inventors found through their study that the pore size in the cured film and the particle size of the droplets are generally the same. Accordingly, the median diameter d50 on a volume basis (hereinafter referred to as volume median diameter) of the droplets 101 of the aqueous liquid (W) in the oil-based liquid (O) is desirably in the range of 0.1 μm to 20 μm. More desirably, the volume median diameter d50 of the droplets 101 in the oil-based liquid (O) is desirably in the range of 0.1 μm to 1 μm, still more desirably 0.2 μm to 0.5 μm. The volume median diameter d50 can be calculated from the particle size distribution on a volume basis measured by, for example, a light scattering method.

Water (C)

Desirably, the content of the water (C) in the ink 10 is in the range of 5% by mass to 50% by mass, more desirably in the range of 10% by mass to 30% by mass, relative to the total mass of the ink 10.

By controlling the water (C) content in the ink 10 to 5% by mass or more, the volume of the pores in the film 106 can be increased, and thus the whiteness of the film 106 can be increased. If the water (C) content in the ink 10 is higher than 50% by mass, the opacity of the film 106 can be degraded, or the whiteness can be reduced.

Other Constituents in Aqueous Liquid (W)

The aqueous liquid (W) may further contain other additives according to the use thereof within a range in which the intended effects of the present invention are produced. The additives used in the aqueous liquid (W) are not compatible with the oil-based liquid (O). Such additives include a hydrophilic antioxidant, a hydrophilic organic solvent, and a hydrophilic specific gravity adjusting agent. The specific gravity adjusting agent can reduce the floating of liquid droplets (creaming) caused by the difference in specific gravity between the oil-based liquid (O) and the aqueous liquid (W). Examples of such a hydrophilic specific gravity adjusting agent include, but are not limited to, water-soluble salts, such as sodium chloride and potassium chloride. The content of the salt as the specific gravity adjusting agent depends on the specific gravity of the oil-based liquid (O), but is, advantageously, in the range of 1% by mass to 5% by mass relative to the aqueous liquid (W).

Other Constituents in Ink

The ink 10 may further contain other constituents in addition to the oil-based liquid (O) and the aqueous liquid (W) according to the purpose of use within a range in which the intended effects of the present invention are produced. For example, an emulsifier (D) may be added. As described above, the ink 10 is a dispersion in which the droplets 101 of the aqueous liquid (W) are dispersed in the oil-based liquid (O). The emulsifier (D) has the function of stabilizing the dispersion of the droplets 101. The emulsifier (D) may be a surfactant (Da) or inorganic particles (Db). The emulsifier (D) may be a combination of a surfactant (Da) and inorganic particles (Db), or a combination of either or both of these emulsifiers and another emulsifier (D).

Surfactant (Da)

Advantageously, the ink 10 contains a surfactant (Da). The surfactant (Da) enables the droplets 101 dispersed in the ink 10 to be more stably dispersed and controls the particle size of the droplets 101. Hence, by adding a surfactant (Da) to the ink 10, the droplets 101 are prevented from aggregating together, thus being kept a desired size. By adding a surfactant (Da), the ink 10 can be in a state in which the droplets 101 of the aqueous liquid (W) are dispersed in the oil-based liquid (O) without being aggregated by layer separation between the oil-based liquid (O) and the aqueous liquid (W) even if the ink 10 is allowed to stand at 25° C. for a certain period or more.

The surfactant (Da) may be composed of a single compound or a combination of a plurality of surfactants.

Desirably, the surfactant (Da) is nonionic. The use of a nonionic surfactant as the surfactant (Da) facilitates the formation of a W/O emulsion in which the droplets of the aqueous liquid (W) are dispersed in the oil-based liquid (O). The nonionic surfactant may be a hydrocarbon-based surfactant.

The hydrocarbon-based surfactant may be a polyoxyalkylene alkyl ether produced by adding an alkylene oxide having a carbon number of 2 to 4 to an alkyl alcohol having a carbon number of 1 to 50.

Examples of the polyoxyalkylene alkyl ether include methyl alcohol ethylene oxide adduct, decyl alcohol ethylene oxide adduct, lauryl alcohol ethylene oxide adduct, cetyl alcohol ethylene oxide adduct, oleyl alcohol ethylene oxide adduct, stearyl alcohol ethylene oxide adduct, and stearyl alcohol ethylene oxide/propylene oxide adduct. The terminal group of the polyoxyalkylene alkyl ether is not limited to the hydroxy group formed by simply adding a polyalkylene oxide to an alkyl alcohol. The hydroxy group may be substituted with a polar functional group, such as carboxy, amino, pyridyl, thiol, or silanol, or a hydrophobic functional group, such as alkyl or alkoxy.

A commercially available polyoxyethylene alkyl ether may be used. Examples of the commercially available polyoxyethylene alkyl ether include, but are not limited to, NONION (registered trademark) series produced by NOF; BLAUNON series and FINESURF series each produced by Aoki Oil Industrial; Pluriol (registered trademark) series produced by BASF; and EMULGEN (registered trademark) series produced by Kao.

If the ink 10 contains a surfactant (Da), the surfactant (Da) content is desirably in the range of 0.001% by mass to 20% by mass relative to the total mass of the ink 10. More desirably, it is in the range of 0.01% by mass to 10% by mass, and more desirably in the range of 0.1% by mass to 10% by mass. The surfactant (Da) with a content in such a range enables the droplets 101 to be dispersed more stably.

Inorganic Particles (Db)

The ink 10 may contain inorganic particles (Db). The inorganic particles (Da) enable the droplets 101 dispersed in the ink 10 to be more stably dispersed and can control the particle size of the droplets 101. Hence, by adding inorganic particles (Db) to the ink 10, the droplets 101 are prevented from aggregating together, thus being kept a desired size. By adding inorganic particles (Db), the ink 10 can be in a state in which the droplets 101 of the aqueous liquid (W) are dispersed in the oil-based liquid (O) without being aggregated by layer separation between the oil-based liquid (O) and the aqueous liquid (W) even if the ink 10 is allowed to stand at 25° C. for a certain period or more.

The present inventors assume that this advantageous effect of the inorganic particles (Db) in the ink 10 is produced by the following mechanism. In the ink 10, part of the inorganic particles (Db) adsorb to interfaces between the oil-based liquid (O) and the aqueous liquid (W). In other words, the inorganic particles are present between the oil-based liquid (O) and the droplets 101. If one of these inorganic particles (Db) is observed, at least a portion of the inorganic particle (Db) is present outside the interface between the oil-based liquid (O) and the droplet 101 and in the oil-based liquid (O). Thus, if droplets 101 come close to each other, inorganic particles adsorbed to the interface of one of the droplets 101 will sterically reject the other, thereby inhibiting the droplets 101 from aggregating together. Consequently, the ink 10 can be in a state where the aqueous liquid (W) is stably dispersed in the oil-based liquid (O).

Any particles containing an inorganic material may be used as the inorganic particles (Db), and the surfaces of the inorganic particles may optionally have a surface modifying layer or an absorbing layer, made of an organic or an inorganic material. The inorganic material of the inorganic particles (Db) may be composed of a single compound or a plurality of compounds. The inorganic particles (Db) may be a mixture of a plurality of types of inorganic particles.

The inorganic material of the inorganic particles (Db) may be, but is not limited to, at least one metal oxide selected from the group consisting of silicon dioxide, mica, aluminum oxide, boehmite, iron oxide, titanium oxide, barium titanate, zirconium oxide, zinc oxide, and niobium oxide. Desirably, at least one selected from the group consisting of silicon dioxide, aluminum oxide, and titanium oxide is used from the viewpoint of the dispersion stability of the droplets 101 and the material cost of the inorganic particles (Db).

Advantageously, inorganic particles (Db) having a high refractive index are used. In this instance, the refractive index of the inorganic particles (Db) is desirably 0.05 or more higher than the refractive index of a cured product of the polymerizable compound (A).

By controlling the refractive index of the inorganic particles (Db) to such a level, the reflectance at the interfaces between the inorganic particles (Db) and the cured product (polymer) of the polymerizable compound (A) can be increased. Light that has entered the film 106 can be diffusely reflected or scattered also from the interfaces between the inorganic particles (Db) and the cured product of the polymerizable compound (A). Thus the whiteness of the film 106 is further increased. Consequently, the whiteness of white images formed with the ink 10 is further increased.

The refractive index of the cured product of the polymerizable compound (A) is generally about 1.5. Accordingly, the refractive index of the inorganic particles (Db) is desirably, but not limited, in the range of 1.7 to 2.8.

Therefore, titanium oxide particles are advantageously used as the inorganic particles (Db). The use of titanium oxide particles as the inorganic particles (Db) increases the whiteness of the film 106 while increasing the dispersion stability of the droplets 101. In addition, titanium oxide particles are advantageous in terms of cost. The refractive index of titanium oxide varies depending on the crystalline form, but is generally 2.52 to 2.71.

Desirably, the volume median diameter d50 of the inorganic particles (Db) in the ink 10 is in the range of 5 nm to 100 nm. Inorganic particles (Db) having a smaller particle size are more likely to adsorb to the interfaces between the droplets 101 dispersed in the ink 10 and the oil-based liquid (O), accordingly allowing the droplets 101 to be dispersed more stably.

Desirably, the ratio (R/r) of the median diameter R of the droplets 101 to the median diameter r of the inorganic particles (Db) is in the range of 5 to 400. If the R/r ratio is lower than 5, the inorganic particles (Db) are extremely larger than the droplets 101 and are accordingly less likely to adsorb to the interfaces between the droplets 101 and the oil-based liquid (O). If the R/r ratio is higher than 400, the inorganic particles (Db) are extremely smaller than the droplets 101, and accordingly a larger number of inorganic particles (Db), which are intended to stabilize the dispersion of the droplets 101, are likely to adsorb to the interfaces between the droplets 101 and the oil-based liquid (O). In any case, when the R/r ratio is outside the above range, the inorganic particles (Db) cannot stabilize the dispersion as expected.

The coverage of the droplets 101 with the inorganic particles (Db) adsorbed to the interfaces between the droplets 101 and the oil-based liquid (O) is desirably in the range of 50% to 100%. More desirably, it is in the range of 70% to 100%, such as 80% to 100% or 90% to 100%. When the coverage of the droplets 101 with the inorganic particles (Db) is 50% or more, the inorganic particles (Db) sterically repulse each other and thus prevent the droplets 101 covered therewith from aggregating together even if the droplets 101 come into contact with each other. Thus, the droplets 101 can be dispersed more stably.

Even if the ink 10 contains a plurality of inorganic particles (Db), all the inorganic particles (Db) in the ink 10 do not necessarily adsorb to the interfaces between the droplets 101 and the oil-based liquid (O). Part of the inorganic particles (Db) may be dispersed in the oil-based liquid (O).

The inorganic particles (Db) contain a metal oxide as mentioned above or any other inorganic material having a high specific gravity and thus tend to have a higher specific gravity than the oil-based liquid (O) and the aqueous liquid (W). Stokes' law representing the sedimentation velocity (terminal velocity) of small particles in a fluid teaches that the sedimentation velocity of particles dispersed in a fluid (liquid component in the ink 10) is reduced by reducing the diameter of the particles. The sedimentation velocity of the inorganic particles (Db) can be significantly reduced by using inorganic particles having a particle size of 100 nm or less although it depends on the viscosity of the liquid component in the ink 10. Thus, the inorganic particles (Db) can be easily kept dispersed in the ink 10 for a long time without settling.

If the ink 10 contains inorganic particles (Db), the content of the inorganic particles (Db) is in the range of 0.1% by mass to 20% by mass relative to the total mass of the ink 10. More desirably, it is in the range of 1.0% by mass to 15% by mass, and more desirably in the range of 5.0% by mass to 10% by mass. The inorganic particles (Db) with a content in such a range enable the droplets 101 to disperse more stably.

Preparation of Photo-Curable Ink Composition

The ink 10 is in the form of a dispersion in which the aqueous liquid (W) is formed into droplets 101 and dispersed in the oil-based liquid (O). The ink 10 in such a state can be prepared by the following method.

First, a polymerizable compound (A) and a photopolymerization initiator (B) are mixed. Other constituents may optionally be added to the mixture, and thus the oil-based liquid (O) is prepared. In preparation of the aqueous liquid (W), appropriate constituents are optionally added to water.

Then, the aqueous liquid (W) is added to the oil-based liquid (O) with stirring, and the mixture is further stirred. Thus, droplets 101 of the aqueous liquid (W) are formed in the oil-based liquid (O).

For stirring, a homogenizer, an ultrasonic disperser, or any other stirring device may be used. Homogenizers and ultrasonic dispersers are advantageous for reducing the particle size of the droplets 101 of the aqueous liquid (W). The particle size of the droplets 101 dispersed in the ink 10 can be controlled by varying stirring conditions, which may depend on the composition of the ink 10.

If a surfactant (Da) or inorganic particles (Db) are added as the emulsifier (D) to the ink 10, the surfactant (Da) or the inorganic particles (Db) are added to the oil-based liquid (O) containing the polymerizable compound (A) and the photopolymerization initiator (B) after it has been prepared. Then, the aqueous liquid (W) is added to the resulting liquid with stirring. Desirably, the mixture is further stirred so that the aqueous liquid (W) is formed into droplets 101.

Ink Cartridge

An ink cartridge according to an embodiment includes an ink, and an ink compartment containing the ink. The ink in the ink compartment is the above-described ink 10.

The ink compartment may include a negative pressure generating member chamber containing a negative pressure generating member impregnated with the ink by a negative pressure, and an ink chamber containing the portion of the ink not impregnated into the negative pressure generating member. Alternatively, the ink compartment may be configured to hold ink in a state where the negative pressure generating member is impregnated with all the ink without having the ink chamber as described above, or to hold ink in a state where the ink is not impregnated into the negative pressure generating member without having the negative pressure generating member. The ink cartridge may include the ink compartment and a recording head.

Image Forming Method

In an image forming method according to an embodiment, images are formed by applying the ink 10 according to an embodiment of the present invention onto a substrate. More specifically, the image forming method includes applying the ink 10 on a substrate 102 that is a recording medium (ink application step), and irradiating the ink 10 on the substrate 102 with light (irradiation step). The range of meaning of the term "image" used herein includes a solid pattern that is a uniform pattern covering the entirety of a specific area.

(1) Step of applying the ink 10 onto a recording medium 102 (ink application step):

In this step, the ink 10 is applied onto a substrate 102. The ink 10 may be applied by being ejected from an ink jet recording head onto the substrate 102. Ejection from the ink jet recording head is advantageous for increasing the definition of the image. Although any ink jet method may be employed for ejecting the ink without particular limitation, a method (for example, piezoelectric ink jet) of ejecting ink by applying a mechanical energy to the ink is suitable because the ink 10 contains a polymerizable compound (A).

The substrate 102 as the recording medium may be made of, but is not limited to, paper, a polymer material such as vinyl chloride or PET, a metal, wood, cloth, glass, or ceramic. Also, the substrate 102 may be in any form, such as a film, a plate, or a three-dimensional body.

Figure 1B:
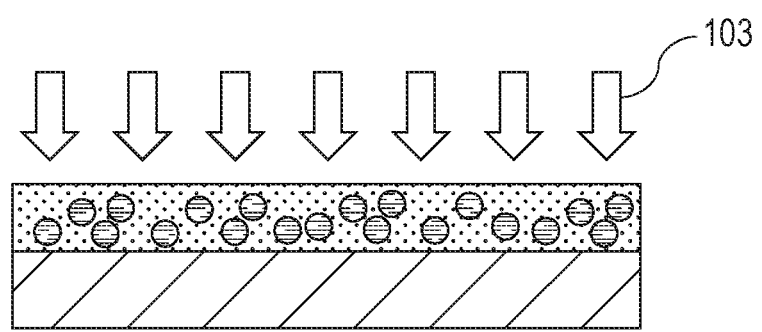
FIG. 1B is a schematic illustrative representation of an image forming method using a photo-curable ink according to an embodiment of the present invention.
Figure 1C:
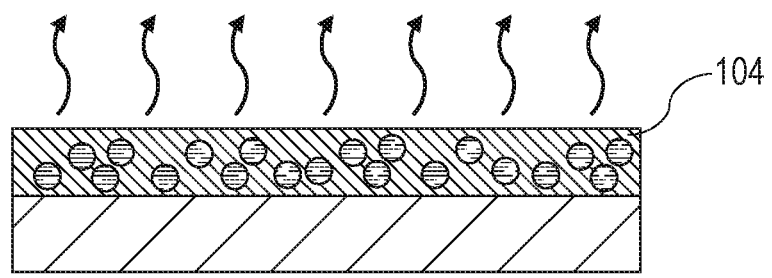
FIG. 1C is a schematic illustrative representation of an image forming method using a photo-curable ink according to an embodiment of the present invention.
Figure 1D:
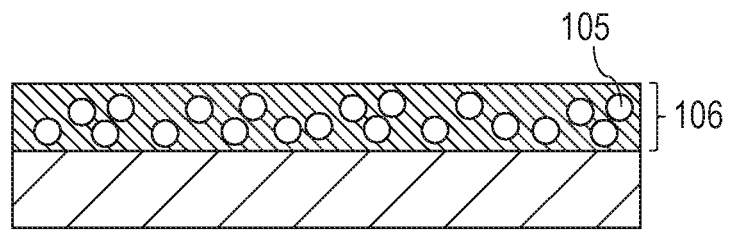
FIG. 1D is a schematic illustrative representation of an image forming method using a photo-curable ink according to an embodiment of the present invention.

(2) Step of irradiating the ink 10 on the substrate 102 with light (irradiation step):

After depositing the ink 10 on the substrate 102 (FIG. 1A), the ink 10 is irradiated with light 103, such as ultraviolet light, as shown in FIG. 1B. Thus, the ink 10 is cured.

Any type of light may be used as the light 103 used for the irradiation step, and the light can be selected according to the wavelength to which ink 10 can sense. Examples of such light include ultraviolet light having a wavelength of 150 nm to 400 nm, X-ray radiation, and electron beams.

Ultraviolet light is more suitable as the light with which the ink 10 is irradiated. This is because many of the commercially available photopolymerization initiators are sensitive to ultraviolet light. Light sources that emit ultraviolet light include high-pressure mercury-vapor lamps, ultrahigh-pressure mercury-vapor lamps, low-pressure mercury-vapor lamps, Deep-UV lamps, carbon arc lamps, chemical lamps, metal halide lamps, xenon lamps, light-emitting diode (LED) lumps, KrF excimer lasers, ArF excimer lasers, and F2 excimer lasers. An ultrahigh-pressure mercury-vapor lamp or an LED lump is advantageous. The number of light sources may be one or more.

The ink 10 of the above-described embodiment is in a state in which the aqueous liquid (W) in the form of droplets is dispersed in an oil-based liquid (O). When the ink 10 is irradiated with light, the oil-based liquid (O) is cured to form a cured product 104.

At this time, the aqueous liquid (W) is evaporated, without being cured, while the oil-based liquid (O) is being cured and/or after it has been cured. Consequently, pores 105 having a pore size corresponding to the particle size of the droplets 101 are formed in the positions where the droplets 101 of the aqueous liquid (W) have been present.

During and/or after the irradiation step, the ink on the substrate may be dried by heating or air blowing. Thus, the evaporation of the aqueous liquid (W) is accelerated to rapidly dry the film 106.

EXAMPLES

The present invention will be further described in detail with reference to the following Examples. However, the invention is not limited to the disclosed Examples. In the following description. "part(s)" and "%" are on a mass basis unless otherwise specified.

Preparation of Photo-Curable Ink

Photo-curable inks of Examples 1 to 20 and Comparative Examples 1 to 5 were each prepared by mixing and stirring the constituents in the respective proportions shown in Table 1 or Table 2. Each oil-based liquid (O) prepared by mixing the constituents in the respective proportions shown in Table 1 or Table 2 was placed in a 20 mL bottle and stirred with a homogenizer (AHG-160D, manufactured by AS ONE Corporation) equipped with a shaft generator (HT1008, manufactured by AS ONE Corporation). Then, water (C) was slowly added into the bottle, followed by stirring for 3 minutes. The rotational speed of the homogenizer was 2000 rpm for Examples 1 to 8 and Comparative Examples 2, 3, and 5. For Examples 9 to 20 and Comparative Example 4, it was 15000 rpm. The proportions of the constituents shown in Table 1 and Table 2 are on a percent-by-mass basis.

Constituents

Polymerizable Compound (A) in Examples (A-1) Light Acrylate IB-XA (isobornyl acrylate, produced by Kyoeisha Chemical)

(A-2) Biscoat #230 (1,6-hexanediol diacrylate, produced by Osaka Organic Chemical Industry)

(A-3) Biscoat #160 (benzyl acrylate, produced by Osaka Organic Chemical Industry)

(A-4) 1,6-Hexanediol dimethacrylate (produced by Tokyo Chemical Industry)

(A-5) Light Acrylate NP-A (neopentyl glycol diacrylate, produced by Kyoeisha Chemical)

(A-6) Biscoat #310 HP (tripropylene glycol diacrylate, produced by Osaka Organic Chemical Industry)

Photopolymerization Initiator (B) in Examples (B-1) Lucirin TPO (2,4,6-trimethylbenzoyl-diphenyl-phosphine oxide, produced by BASF)

Water (C) in Examples (C-1) Ion-exchanged water (C-2) 2% Sodium chloride aqueous solution (solution of 2% by mass of sodium chloride in water)

Emulsifier (D) in Examples

Surfactant (Da) in Examples (Da-1) NONION E-202 (polyethylene oxide oleyl ether, produced by NOF)

(Da-2) NONION S-202 (polyethylene oxide stearyl ether, produced by NOF)

Inorganic Particles (Db) in Examples (Db-1) Dispersion of titanium oxide particles (AMT-100, produced by Tayca) in acrylic monomer:

A titanium oxide slurry TKD-701 (produced by Tayca), which is a dispersion of titanium oxide particles AMT-100 in isopropyl alcohol, and Biscoat #230 were mixed in a ratio of 1:1, and the mixture was stirred. Then, the isopropyl alcohol contained in TKD-701 was removed by using an evaporator, and thus a dispersion of titanium oxide AMT-100 in acrylic monomer (Biscoat #230) was prepared.

The volume median diameter d50 of the titanium oxide particles AMT-100 in TKD701 was 91 nm, which was measured with a dynamic light scattering particle size analyzer (Nanotrac UPA-EX 150, manufactured by Nikkiso). The content of titanium oxide particles AMT-100 in TKD-701 was 17% by mass. Hence, the titanium oxide particle content in the resulting dispersion (Db-1) was 17% by mass.

(Db-2) Dispersion of titanium oxide particles (MT-100HD, produced by Tayca) in acrylic monomer:

Titanium oxide particles MT-100HD were dispersed in acryloylmorpholine to prepare a dispersion.

The volume median diameter d50 of the titanium oxide particles MT-100HD in the resulting dispersion was 71 nm, which was measured with a dynamic light scattering particle size analyzer (Nanotrac UPA-EX 150, manufactured by Nikkiso). The content of titanium oxide particles MT-100HD in the dispersion was 30% by mass.

(Db-3) Dispersion MEK-ST of silicon dioxide particles in methyl ethyl ketone (MEK):

The silicon dioxide particles contained in dispersion MEK-ST (produced by Nissan Chemical Industries) have a volume median diameter d50 of 15 nm. The silicon dioxide particle content in dispersion MEK-ST is 30% by mass.

(Db-4) Dispersion MEK-ST-L of silicon dioxide particles in methyl ethyl ketone (MEK):

The silicon dioxide particles contained in dispersion MEK-ST-L (produced by Nissan Chemical Industries) have a volume median diameter d50 of 50 nm. The silicon dioxide particle content in dispersion MEK-ST-L is 30% by mass.

(Db-5) Dispersion MIBK-ST of silicon dioxide particles in methyl isobutyl ketone (MIBK):

The silicon dioxide particles contained in dispersion MIBK-ST (produced by Nissan Chemical Industries) have a volume median diameter d50 of 15 nm. The silicon dioxide particle content in dispersion MIBK-ST is 30% by mass.

(Db-6) Dispersion of titanium oxide particles (MT-100HD, produced by Tayca) in acrylic monomer:

Titanium oxide particles MT-100HD were dispersed in 1,6-hexanediol diacrylate to prepare a dispersion. The volume median diameter d50 of the titanium oxide particles MT-100HD in the resulting dispersion was 53 nm, which was measured with a dynamic light scattering particle size analyzer (Nanotrac UPA-EX 150, manufactured by Nikkiso). The content of titanium oxide particles MT-100HD in the dispersion was 28% by mass.

(Db-7) Dispersion NANOBYK-3601 of aluminum oxide particles in tripropylene glycol diacrylate:

The aluminum oxide particles contained in dispersion NANOBYK-3601 (produced by BYK) have a volume median diameter d50 of 40 nm. The aluminum oxide particle content in dispersion NANOBYK-3601 is 30% by mass.

(Db-8) Dispersion NANOBYK-3602 of aluminum oxide particles in 1,6-hexanediol diacrylate:

The aluminum oxide particles contained in dispersion NANOBYK-3602 (produced by BYK) have a volume median diameter d50 of 40 nm. The aluminum oxide particle content in dispersion NANOBYK-3602 is 30% by mass.

(Db-9) Dispersion NANOBYK-3605 of silicon dioxide particles in 1,6-hexanediol diacrylate:

The silicon dioxide particles contained in dispersion NANOBYK-3605 (produced by BYK) have a volume median diameter d50 of 25 nm. The silicon dioxide particle content in dispersion NANOBYK-3605 is 50% by mass.

Other Constituents of Comparative Examples (Z-1) Ethanol (produced by Wako Pure Chemical Industries)

(Z-2) Methyl ethyl ketone (produced by Kishida Chemical)

Preparation

Example 1

In 84.0 parts by mass of polymerizable compound (A-1) were dissolved 3.0 parts by mass of photopolymerization initiator (B-1) and 3.0 parts by mass of surfactant (Da-1) to yield an oil-based liquid (O). To the oil-based liquid (O) was added 10.0 parts by mass of water (C-1) with stirring under the above-described conditions. Then, the mixture was further stirred to form a W/O emulsion in which droplets of water (C-1) were dispersed in the oil-based liquid (O). Thus Ink 1 was prepared for Example 1.

Example 2

Ink 2 was prepared for Example 2 in the same manner as in Example 1, except that the proportions of polymerizable compound (A-1) and water (C-1) were varied to 74.0 parts by mass and 20.0 parts by mass, respectively.

Example 3

In 37.9 parts by mass of polymerizable compound (A-2) were dissolved 3.0 parts by mass of photopolymerization initiator (B-1) and 3.0 parts by mass of surfactant (Da-1). To this solution was added 29.4 parts by mass of dispersion (Db-1) of inorganic particles (Db) to yield an oil-based liquid (O). To the oil-based liquid (O) was added 26.7 parts by mass of water (C-1) with stirring under the above-described conditions. Then, the mixture was further stirred to form a W/O emulsion. Thus Ink 3 was prepared for Example 3. The solids content of the inorganic particles in Ink 3 was 5.0 parts by mass.

Example 4

Ink 4 was prepared for Example 4 in the same manner as in Example 3, except that the proportions of polymerizable compound (A-2) and water (C-1) were varied to 51.3 parts by mass and 13.3 parts by mass, respectively.

Example 5

In 57.3 parts by mass of polymerizable compound (A-2) were dissolved 3.0 parts by mass of photopolymerization initiator (B-1) and 3.0 parts by mass of surfactant (Da-2). To this solution was added 16.7 parts by mass of dispersion (Db-2) of inorganic particles (Db) to yield an oil-based liquid (O). To the oil-based liquid (O) was added 20.0 parts by mass of water (C-1) with stirring under the above-described conditions. Then, the mixture was further stirred to form a W/O emulsion. Thus Ink 5 was prepared for Example 5. The solids content of the inorganic particles in Ink 5 was 5.0 parts by mass.

Comparative Example 1

Ink 6 was prepared for Comparative Example 1 by dissolving 3.0 parts by mass of photopolymerization initiator (B-1) in 97.0 parts by mass of polymerizable compound (A-1).

Comparative Example 2

An oil-based liquid (O) was prepared by dissolving 3.0 parts by mass of photopolymerization initiator (B-1) in 77.0 parts by mass of polymerizable compound (A-2). To the oil-based liquid (O) was added 20.0 parts by mass of ethanol (Z-1) with stirring under the above-described conditions. Then, the mixture was further stirred to yield Ink 7 for Comparative Example 2.

Comparative Example 3

An oil-based liquid (O) was prepared by dissolving 3.0 parts by mass of photopolymerization initiator (B-1) in 80.3 parts by mass of polymerizable compound (A-2). To the oil-based liquid (O) was added 16.7 parts by mass of dispersion (Db-2) of inorganic particles (Db) with stirring under the above-described conditions. Then, the mixture was further stirred to yield Ink 8 for Comparative Example 3. The solids content of the inorganic particles (Db) in Ink 8 was 5.0 parts by mass.

Comparative Example 4

An oil-based liquid (O) was prepared by dissolving 3.0 parts by mass of photopolymerization initiator (B-1) in 56.0 parts by mass of polymerizable compound (A-2). To the oil-based liquid (O) was added 41.0 parts by mass of water (C-1) with stirring under the above-described conditions. Then, the mixture was further stirred to yield Ink 9 for Comparative Example 4.

Example 6

In 60.3 parts by mass of polymerizable compound (A-2) was dissolved 3.0 parts by mass of photopolymerization initiator (B-1). To this solution was added 16.7 parts by mass of dispersion (Db-3) of inorganic particles (Db) to yield an oil-based liquid (O). To the oil-based liquid (O) was added 20.0 parts by mass of water (C-1) with stirring under the above-described conditions. Then, the mixture was further stirred to form a W/O emulsion in which droplets of water (C-1) were dispersed in the oil-based liquid (O). Thus Ink 10 was prepared for Example 6. The solids content of the inorganic particles (Db) in Ink 10 was 5.0 parts by mass.

Example 7

Ink 11 was prepared for Example 7 in the same manner as in Example 6, except that the dispersion (Db-3) of inorganic particles was replaced with 16.7 parts by mass of dispersion (Db-4) of inorganic particles. The solids content of the inorganic particles (Db) in Ink 11 was 5.0 parts by mass.

Example 8

Ink 12 was prepared for Example 8 in the same manner as in Example 6, except that the dispersion (Db-3) of inorganic particles was replaced with 16.7 parts by mass of dispersion (Db-5) of inorganic particles. The solids content of the inorganic particles (Db) in Ink 12 was 5.0 parts by mass.

Example 9

Ink 13 was prepared for Example 9 in the same manner as in Example 6, except that the proportion of the polymerizable compound (A-2) was varied to 73.4 parts by mass and that dispersion (Db-3) of inorganic particles was replaced with 3.6 parts by mass of dispersion (Db-6) of inorganic particles. The solids content of the inorganic particles in Ink 13 was 1.0 parts by mass.

Example 10

Ink 14 was prepared for Example 10 in the same manner as in Example 9, except that the proportions of polymerizable compound (A-2) and dispersion (Db-6) of inorganic particles were varied to 59.1 parts by mass and 17.9 parts by mass, respectively. The solids content of the inorganic particles (Db) in Ink 14 was 5.0 parts by mass.

Example 11

Ink 15 was prepared for Example 11 in the same manner as in Example 9, except that the proportions of polymerizable compound (A-2) and dispersion (Db-6) of inorganic particles were varied to 41.2 parts by mass and 35.8 parts by mass, respectively. The solids content of the inorganic particles (Db) in Ink 15 was 10.0 parts by mass.

Example 12

Ink 16 was prepared for Example 12 in the same manner as in Example 6, except that the dispersion (Db-3) of inorganic particles was replaced with 16.7 parts by mass of dispersion (Db-7) of inorganic particles. The solids content of the inorganic particles (Db) in Ink 16 was 5.0 parts by mass.

Example 13

Ink 17 was prepared for Example 13 in the same manner as in Example 6, except that the dispersion (Db-3) of inorganic particles was replaced with 16.7 parts by mass of dispersion (Db-8) of inorganic particles. The solids content of the inorganic particles (Db) in Ink 17 was 5.0 parts by mass.

Example 14

Ink 18 was prepared for Example 14 in the same manner as in Example 6, except that the proportion of polymerizable compound (A-2) was varied to 67.0 parts by mass and that dispersion (Db-3) of inorganic particles was replaced with 10.0 parts by mass of dispersion (Db-9) of inorganic particles. The solids content of the inorganic particles (Db) in Ink 18 was 5.0 parts by mass.

Comparative Example 5

Ink 19 was prepared for Comparative Example 5 in the same manner as in Comparative Example 2, except that ethanol (Z-1) was replaced with 20.0 parts by mass of methyl ethyl ketone (Z-2).

Example 15

In 52.1 parts by mass of polymerizable compound (A-1) was dissolved 10.0 parts by mass of photopolymerization initiator (B-1). To this solution was added 17.9 parts by mass of dispersion (Db-6) of inorganic particles (Db) to yield an oil-based liquid (O). To the oil-based liquid (O) was added 20.0 parts by mass of 2% sodium chloride aqueous solution (C-2) with stirring under the above-described conditions.

Then, the mixture was further stirred to form a W/O emulsion in which droplets of 2% sodium chloride aqueous solution (C-2) were dispersed in the oil-based liquid (O). Thus Ink 20 was prepared for Example 15. The solids content of the inorganic particles (Db) in Ink 20 of Example 15 was 5.0 parts by mass.

Example 16

Ink 21 was prepared for Example 16 in the same manner as in Example 15, except that polymerizable compound (A-1) was replaced with 52.1 parts by mass of polymerizable compound (A-3). The solids content of the inorganic particles (Db) in Ink 21 of Example 16 was 5.0 parts by mass.

Example 17

Ink 22 was prepared for Example 17 in the same manner as in Example 15, except that polymerizable compound (A-1) was replaced with 52.1 parts by mass of polymerizable compound (A-4). The solids content of the inorganic particles (Db) in Ink 22 of Example 17 was 5.0 parts by mass.

Example 18

Ink 23 was prepared for Example 18 in the same manner as in Example 15, except that polymerizable compound (A-1) was replaced with 52.1 parts by mass of polymerizable compound (A-2). The solids content of the inorganic particles (Db) in Ink 23 of Example 18 was 5.0 parts by mass.

Example 19

Ink 24 was prepared for Example 19 in the same manner as in Example 15, except that polymerizable compound (A-1) was replaced with 52.1 parts by mass of polymerizable compound (A-5). The solids content of the inorganic particles (Db) in Ink 24 of Example 19 was 5.0 parts by mass.

Example 20

Ink 25 was prepared for Example 20 in the same manner as in Example 15, except that polymerizable compound (A-1) was replaced with 52.1 parts by mass of polymerizable compound (A-6). The solids content of the inorganic particles (Db) in Ink 25 of Example 20 was 5.0 parts by mass.

TABLE 1

|  |  | Polymerizable compound (A) | | Photopolymerization initiator (B) | Water (C) | Emulsifier (D) | | | | | |
|---|---|---|---|---|---|---|---|---|---|---|---|
|  |  | | | | | Surfactant (Da) | | Inorganic particles (Db) | | | |
|  |  | A-1 | A-2 | B-1 | C-1 | Da-1 | Da-2 | Db-1 | Db-2 | Db-3 | Db-4 |
| Example 1 | Ink 1 | 84.0 |  | 3.0 | 10.0 | 3.0 |  |  |  |  |  |
| Example 2 | Ink 2 | 74.0 |  | 3.0 | 20.0 | 3.0 |  |  |  |  |  |
| Example 3 | Ink 3 |  | 37.9 | 3.0 | 26.7 | 3.0 |  | 29.4 |  |  |  |
| Example 4 | Ink 4 |  | 51.3 | 3.0 | 13.3 | 3.0 |  | 29.4 |  |  |  |
| Example 5 | Ink 5 |  | 57.3 | 3.0 | 20.0 |  | 3.0 | 16.7 |  |  |  |
| Example 6 | Ink 10 |  | 60.3 | 3.0 | 20.0 |  |  |  | 16.7 |  |  |
| Example 7 | Ink 11 |  | 60.3 | 3.0 | 20.0 |  |  |  |  |  | 16.7 |
| Example 8 | Ink 12 |  | 60.3 | 3.0 | 20.0 |  |  |  |  |  |  |
| Example 9 | Ink 13 |  | 73.4 | 3.0 | 20.0 |  |  |  |  |  |  |
| Example 10 | Ink 14 |  | 59.1 | 3.0 | 20.0 |  |  |  |  |  |  |
| Example 11 | Ink 15 |  | 41.2 | 3.0 | 20.0 |  |  |  |  |  |  |
| Example 12 | Ink 16 |  | 60.3 | 3.0 | 20.0 |  |  |  |  |  |  |
| Example 13 | Ink 17 |  | 60.3 | 3.0 | 20.0 |  |  |  |  |  |  |
| Example 14 | Ink 18 |  | 67.0 | 3.0 | 20.0 |  |  |  |  |  |  |
| Comparative Example 1 | Ink 6 | 97.0 |  | 3.0 |  |  |  |  |  |  |  |
| Comparative Example 2 | Ink 7 |  | 77.0 | 3.0 |  |  |  |  |  |  |  |
| Comparative Example 3 | Ink 8 |  | 80.3 | 3.0 |  |  |  | 16.7 |  |  |  |
| Comparative Example 4 | Ink 9 |  | 56.0 | 3.0 | 41.0 |  |  |  |  |  |  |
| Comparative Example 5 | Ink 19 |  | 77.0 | 3.0 |  |  |  |  |  |  |  |

|  | Emulsifier (D) Inorganic particles (Db) | | | | | Other constituents (Z) | | Total |
|---|---|---|---|---|---|---|---|---|
|  | Db-5 | Db-6 | Db-7 | Db-8 | Db-9 | Z-1 | Z-2 |  |
| Example 1 |  |  |  |  |  |  |  | 100.0 |
| Example 2 |  |  |  |  |  |  |  | 100.0 |
| Example 3 |  |  |  |  |  |  |  | 100.0 |
| Example 4 |  |  |  |  |  |  |  | 100.0 |
| Example 5 |  |  |  |  |  |  |  | 100.0 |
| Example 6 |  |  |  |  |  |  |  | 100.0 |
| Example 7 |  |  |  |  |  |  |  | 100.0 |
| Example 8 | 16.7 |  |  |  |  |  |  | 100.0 |
| Example 9 |  | 3.6 |  |  |  |  |  | 100.0 |
| Example 10 |  | 17.9 |  |  |  |  |  | 100.0 |
| Example 11 |  | 35.8 |  |  |  |  |  | 100.0 |
| Example 12 |  |  | 16.7 |  |  |  |  | 100.0 |
| Example 13 |  |  |  | 16.7 |  |  |  | 100.0 |

TABLE 1-continued

| | | | |
|---|---|---|---|
| Example 14 | | 10.0 | 100.0 |
| Comparative Example 1 | | | 100.0 |
| Comparative Example 2 | | 20.0 | 100.0 |
| Comparative Example 3 | | | 100.0 |
| Comparative Example 4 | | | 100.0 |
| Comparative Example 5 | | 20.0 | 100.0 |

TABLE 2

| | | Polymerizable compound (A) | | | | | | Photo-polymerization initiator (B) | Water (C) | Emulsifier (D) Inorganic particles (Db) | |
|---|---|---|---|---|---|---|---|---|---|---|---|
| | | A-1 | A-2 | A-3 | A-4 | A-5 | A-6 | B-1 | C-2 | Db-6 | Total |
| Example 15 | Ink 20 | 52.1 | | | | | | 10.0 | 20.0 | 17.9 | 100.0 |
| Example 16 | Ink 21 | | 52.1 | | | | | 10.0 | 20.0 | 17.9 | 100.0 |
| Example 17 | Ink 22 | | | 52.1 | | | | 10.0 | 20.0 | 17.9 | 100.0 |
| Example 18 | Ink 23 | 52.1 | | | | | | 10.0 | 20.0 | 17.9 | 100.0 |
| Example 19 | Ink 24 | | | | | 52.1 | | 10.0 | 20.0 | 17.9 | 100.0 |
| Example 20 | Ink 25 | | | | | | 52.1 | 10.0 | 20.0 | 17.9 | 100.0 |

Evaluation of Photo-Curable Inks
Formation of Film

On a glass slide (S111, manufactured by Matsunami Glass), 17 μL of Ink 1 of Example 1 was dropped using a micropipette. Then, the dropped Ink 1 was covered with a 100 μm-thick PET film (Tetoron HL92W, manufactured by Teijin DuPont Film) to fill an area of 26 mm×26 mm with Ink 1.

Subsequently, Ink 1 was irradiated for 20 seconds over the PET film with light that has been emitted from a UV light source including an ultrahigh-pressure mercury-vapor lamp and passed through a diffusing plate. Thus, Ink 1 was cured. The irradiation light was UV light having a wavelength of 365 nm and an intensity of 15 mW/cm².

After the irradiation, the PET film was removed from the glass slide. Then, the PET film was allowed to stand at room temperature to evaporate the water from the cured film of the ink. Thus a 25 μm-thick film was obtained on the PET film.

Films of the inks of Examples 2 to 20 and Comparative Examples 1 to 3 and 5 were formed in the same manner.

For Ink 9 of Comparative Example 4, a large aggregate of droplets (probably water droplets) began to appear on the upper side in the container about 1 minutes after preparation, and then the ink was completely divided into two layers after 10 minutes. Ink 9 of Comparative Example 4 was thus unstable. Therefore, the film of Ink 9 was not formed for evaluation. The two separated layers were assumed to be an oil layer of the oil liquid (O) containing the polymerizable compound (A-2) and the photopolymerization initiator (B-1) and a water layer of the water (C). If a film were formed with such a layer-separated liquid, the whiteness of the film would be similar to that of Ink 6 of Comparative Example 1.

Evaluation of Film Whiteness

The whiteness of the films formed above was examined by visual observation and measurement of lightness (L* value). The lightness was measured in the specular component included (SCI) mode of a spectrocolorimeter CM-2600d (manufactured by Konica Minolta).

The results are shown collectively in Table 3.

Measurement of Solubility of Water in (Meth)Acrylic Compound at 25 Degrees

The (meth)acrylic compound (or mixture of (meth)acrylic compounds) of each of the Examples and Comparative Examples and water were placed in a sample tube with a mass ratio of 8:2, and the sample tube was shaken. Then, the sample tube was allowed to stand until the (meth)acrylic compound phase and the water phase separated from each other. The (meth)acrylic compound was removed from the sample tube and the water content therein was measured with a Karl Fischer moisture meter MKC-510 (manufactured by Kyoto Electronics Manufacturing). The obtained water content was defined as the solubility of water at 25° C. The above examinations were all made at 25° C.

Evaluation of Storage Stability

Each of the inks prepared was stored in a shaded sample tube at 25° C. for one week. The storage stability of the inks was visually observed in terms of settling and dispersion stability.

The results are shown collectively in Table 3. When the presence of a sediment was observed in the sample tube tilted after the one-week storage, the sedimentation property of the ink was determined to be bad; when no sediment was observed, the sedimentation property of the ink was determined to be good. When it was found by visual observation that the ink in the sample tube after the one-week storage was divided into two or more layers (layer separation), the dispersion stability of the ink was determined to be bad; when layer separation was not observed, the dispersion stability of the ink was determined to be good.

Each of the inks prepared was stored in a shaded sample tube at 25° C. for two weeks. The stability of each ink was examined in terms of difference between the viscosities before and after storage. More specifically, the viscosity of each ink was measured immediately after the preparation of the ink and after the storage for two weeks, and the percentage of the viscosity after the storage was calculated relative to the viscosity immediately after the preparation. When the viscosity decreased significantly and the percentage was less than 90%, the stability of droplets was determined to be bad; when the viscosity hardly varied after the storage and the percentage was 90% or more, the stability of droplets was determined to be good.

Observation of Film Section

The section of each film formed in the Examples and Comparative Examples was observed as below.

The films of the inks were frozen by being immersed in liquid nitrogen for 10 minutes. Then, each film was cut by hitting a razor FAS-10 (manufactured by FEATHER Safety Razor) with a hammer in a state where the blade of the razor was put on the upper surface of the frozen film. Subsequently, the film was fixed with the cut surface upward on a sample table for scanning electron microscopic (SEM) observation.

For the observation of the section, SEM XL30-SFEG (manufactured by FEI) or S4800 (manufactured by Hitachi) was used. The magnification was 3000 to 60000 times, and the accelerating voltage was 2.0 kV to 5.0 kV. For the observation, the cut surface of section was subjected to Pt—Pd vapor deposition.

Figure 2A:
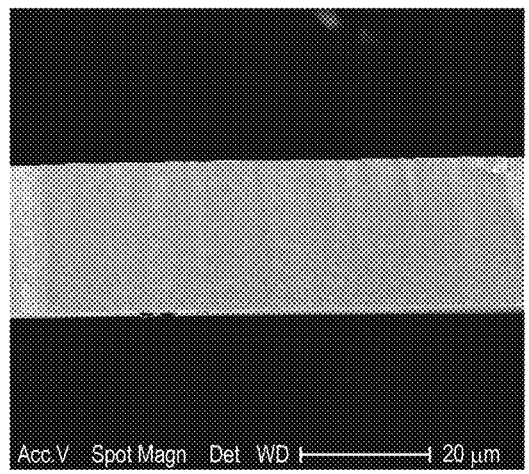
FIG. 2A is an SEM image of a section of a film formed of the photo-curable ink of Comparative Example 2.
Figure 2B:
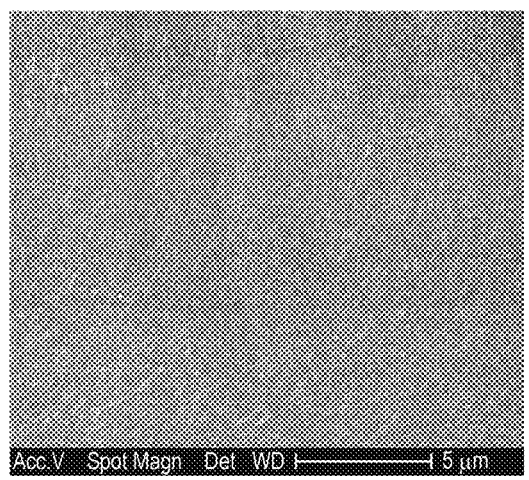
FIG. 2B is an SEM image of a section of a film formed of the photo-curable ink of Comparative Example 2.

Films formed with any of Inks 6, 7, and 19 of Comparative Examples 1, 2, and 5, which did not contain the aqueous liquid (W), exhibited very low whiteness and were transparent or nearly transparent. The section of each of the films was observed. The film of Ink 6 of Comparative Example 1 hardly had pores therein. The film of Ink 7 of Comparative Example 2 had pores therein, but the pores were very small (FIGS. 2A and 2B). Probably, the pores in the film of Ink 7 of Comparative Example 2 were formed by evaporation of ethanol (Z-1) contained in Ink 7 during and/or after the curing of Ink 7. In this case, the ethanol (Z-1) and the polymerizable compound (A-2) were mixed and dissolved in each other in Ink 7. It was therefore assumed that the ethanol (Z-1) in Ink 7 was present in the form of droplets as small as one molecule or several nanometers. Accordingly, the pores formed in the film after curing were very small corresponding to the particle size of the droplets.

Figure 2C:
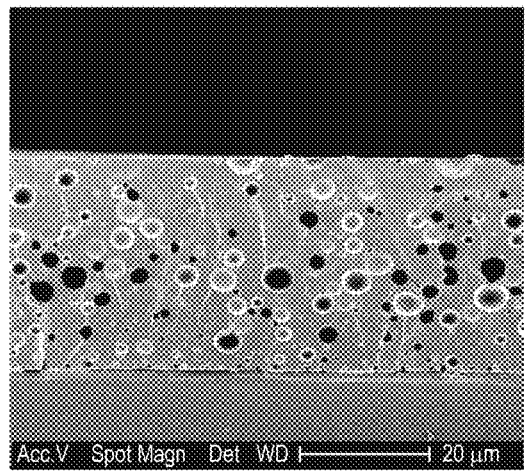
FIG. 2C is an SEM image of a section of a film formed of the photo-curable ink of Example 5.
Figure 2D:
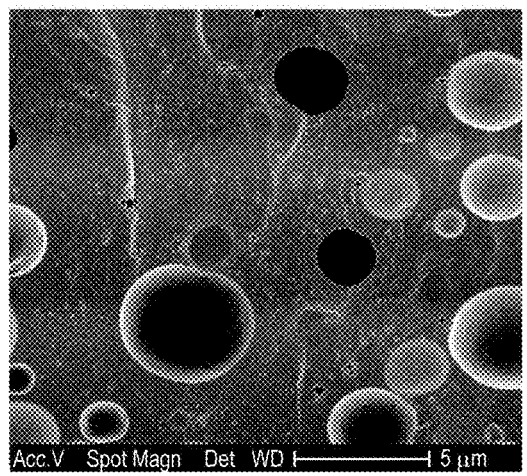
FIG. 2D is an SEM image of a section of a film formed of the photo-curable ink of Example 5.

On the other hand, films formed with any of Inks 1 to 5 and 10 to 25 of Examples 1 to 5 and 6 to 20, which contained the aqueous liquid (W), exhibited good whiteness. When the sections of these films were observed, each film had many pores therein having a diameter in the range of 0.1 m to 20 m. SEM images of the section of the film formed of Ink 5 of Example 5 are shown in FIGS. 2C and 2D by way of Example. The films formed of any of Inks 1 to 5 and 10 to 25 of Examples 1 to 5 and 6 to 20 had similar pores therein. Probably, the pores diffusely reflect incoming light, and consequently, these films exhibited high whiteness.

The inks of the Examples were each milk white and appear to be emulsion. The results of the observation of the film sections suggest that the inks of Examples were in the form of a W/O emulsion in which the aqueous liquid (W) was dispersed in the oil-based liquid. Also, it was found that the pore size in the film was substantially the same as the

TABLE 3

|  | Whiteness | | Solubility of water in polymerizable | Storage stability | | |
| --- | --- | --- | --- | --- | --- | --- |
|  | Visual observation | Lightness (L*) | compound (A) at 25° C. (% by mass) | Sedimentation property | Dispersion stability | Stability of droplets |
| Example 1 | Slightly white | 40 | 0.2 | Good | Good | Good |
| Example 2 | White | 45 | 0.2 | Good | Good | Good |
| Example 3 | Highly white | 64 | 1.1 | Good | Good | Good |
| Example 4 | Highly white | 60 | 1.1 | Good | Good | Good |
| Example 5 | Highly white | 72 | — | Good | Good | — |
| Example 6 | White | 56 | 1.1 | Good | Good | Good |
| Example 7 | White | 46 | 1.1 | Good | Good | Good |
| Example 8 | White | 55 | 1.1 | Good | Good | Good |
| Example 9 | Highly white | 61 | 1.1 | Good | Good | Good |
| Example 10 | Highly white | 75 | 1.1 | Good | Good | Good |
| Example 11 | Highly white | 77 | 1.1 | Good | Good | Good |
| Example 12 | Highly white | 63 | 1.3 | Good | Good | Good |
| Example 13 | Highly white | 66 | 1.1 | Good | Good | Good |
| Example 14 | Highly white | 67 | 1.1 | Good | Good | Good |
| Example 15 | Highly white | 75 | 0.4 | Good | Good | Good |
| Example 16 | White | 56 | 0.6 | Good | Good | Good |
| Example 17 | Highly white | 75 | 0.7 | Good | Good | Good |
| Example 18 | Highly white | 73 | 1.1 | Good | Good | Good |
| Example 19 | Highly white | 77 | 1 1 | Good | Good | Good |
| Example 20 | Highly white | 74 | 2.1 | Good | Good | Bad |
| Comparative Example 1 | Transparent | — | 0.2 | Good | Good | Good |
| Comparative Example 2 | Nearly transparent | 36 | 1.1 | Good | Good | Good |
| Comparative Example 3 | Slightly white | 54 | 1.1 | Good | Good | Good |
| Comparative Example 4 | — | — | 1.1 | Good | Bad | — |
| Comparative Example 5 | Nearly transparent | 36 | 1.1 | Good | Good | Good | particle size of the droplets of the aqueous liquid (W) in the ink. Accordingly, the particle size of the droplets in each ink was estimated to be in the range of 0.1 µm to 20 µm.

Although Ink 9 of Comparative Example 4 contained the aqueous liquid (W), layer separation had been started about one minute after the completion of preparation by stirring and mixing, and the ink was completely layer-separated after 10 minutes, as described above. If a film is formed of a layer-separated ink, the film will be layer-separated on the substrate. Therefore, Ink 9 would result in a transparent film substantially the same as in Comparative Example 1.

On the other hand, Inks 1 to 5 and 10 to 25 of Examples 1 to 5 and 6 to 20, each of which contained the aqueous liquid (W), were not layer-separated even after one-week storage. These inks can each be a photo-curable ink having good storage stability and capable of forming white images having a high whiteness.

Inks of Examples 1 and 2 each contained only a surfactant (Da) as the emulsifier (D). These inks were slightly inferior in whiteness of the film to the inks of other Examples, but had higher storage stability and exhibited comparable film whiteness, compared to the ink of Comparative Example 3, which was a known photo-curable ink containing titanium oxide as a white pigment. It was thus found that the inks of Examples of the present invention can form a highly white film even though they do not contain inorganic particles having a high refractive index, such as titanium oxide particles.

Inks of Examples 3 to 5, 9 to 11, and 15 to 20 each contained titanium oxide particles as inorganic particles (Db) that is a type of the emulsifier (D). Each of the films of these inks had many pores therein having a diameter in the range of 0.1 m to 20 m, thus exhibiting high whiteness.

Figure 2E:
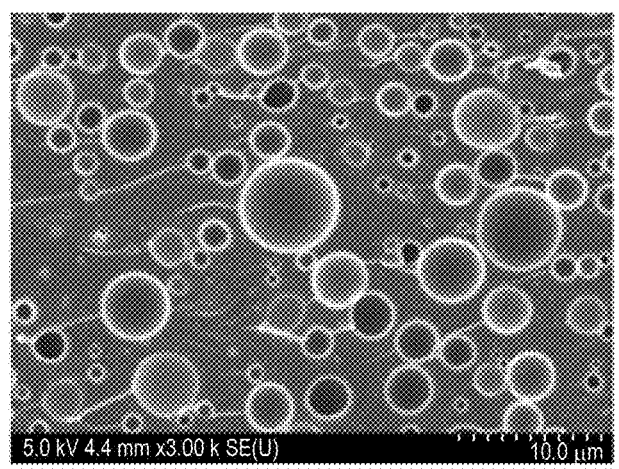
FIG. 2E is an SEM image of a section of a film formed of the photo-curable ink of Example 10.

In particular, Ink 14 of Example 10 formed a film having a particularly high whiteness. When the section of the film of Ink 14 was observed, the pore size was smaller than those in the films of other Examples (FIG. 2E). This is probably because Ink 14 was stirred at a rotational speed of 15000 rpm. The aqueous liquid (W) was thus formed into smaller droplets than the droplets in the inks of other Examples. Although the films formed of the inks of Examples 11 to 20 showed similar results, the film of Ink 13 of Example 9 had larger pores than the films of inks of Examples 10 to 14. This is probably because the content of inorganic particles (Db) in Ink 13 was low and, consequently, the particles size of the droplets became large.

Figure 2F:
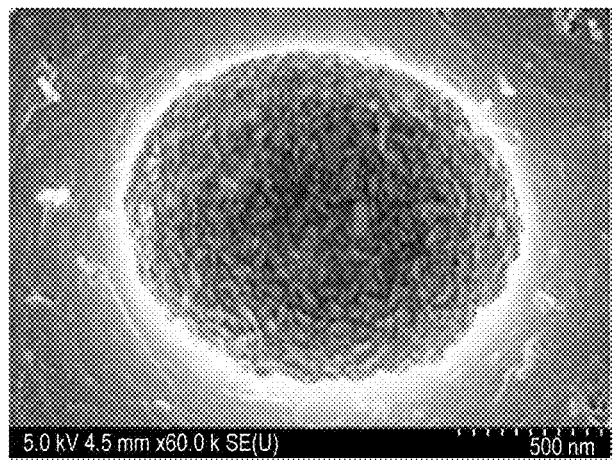
FIG. 2F is an SEM image of a section of a film formed of the photo-curable ink of Example 10.

It was found that the surfaces defining the pores formed in the film of Ink 14 of Example 10 had many particles (FIG. 2F). This suggests that inorganic particles (Db), or titanium oxide particles, are adsorbed to the interfaces of the droplets (water droplets) in Ink 14, and thus stabilize the emulsion. In addition, since the titanium oxide particles lie close to each other without gaps at the interfaces of pores, the coverage of droplets with titanium oxide particles can be considered to be about 100%.

The inks of Examples 1 to 4 and 6 to 19 exhibited viscosities of 90% or more after two-week storage, relative to the viscosity immediately after preparation. This suggests that the viscosity of these inks did not vary much even after the storage for two weeks. Also, the solubility of water in the (meth)acrylic compound in these inks was in the range of 0.01% by mass to 2.0% by mass at 25° C. The present inventors think that such a low solubility of water in the (meth)acrylic compound in these inks contributed to suppressing the migration of water through the (meth)acrylic compound, and that this improves the stability of the droplets in such a manner that the droplets containing water are kept a desired size in the ink. For ink 25 of Example 20, the solubility of water in the (meth)acrylic compound was higher than 2.0% by mass at 25° C. and the viscosity decreased significantly after the two-week storage. This is probably because water migrated through the (meth)acrylic compound and thus grew the droplets containing water during the storage.

The evaluation results of the inks of Examples 6 to 8 and 14, which contained silicon dioxide particles as the inorganic particles (Db) that is a type of the emulsifier (D), will now be described. The inks of Examples 6 to 8 and 14 were each milk white after stirring and mixing, and were kept milky white and did not layer-separate even after the one-week storage. This is probably because the silicon dioxide as the inorganic particles (Db) are adsorbed to the interfaces between the droplets of the aqueous liquid (W) and the oil-based liquid (O), thereby preventing the droplets from aggregating with each other. The inks of Examples 6 to 8 containing the aqueous liquid (W) and silicon dioxide particles as the inorganic particles (Db) exhibited higher whitenesses and higher lightnesses (L* value) than Ink 19 of Comparative Example 5 containing methyl ethyl ketone. This is probably because the films formed in Examples 6 to 8 and 14 each contained many pores having a diameter in the range of 0.1 µm to 20 µm, whereas the film formed in Comparative Example 5 contains very small pores.

For Examples 6 and 7, silicon dioxide particles having different particle sizes were used. The particle size in Example 6 was smaller than that in Example 7. Although the silicon dioxide particle content in terms of mass was the same in both Examples, the number concentration of silicon dioxide particles in Example 6 was higher than that in Example 7 because the particle size in Example 6 is smaller. In the ink of Example 6, therefore, the particle size of droplets of the aqueous liquid (W) was kept small, and the resulting film exhibited a higher whiteness.

The inks of Examples 12 and 13, which contained aluminum oxide particles as the inorganic particles (Db), were also photo-curable inks having good storage stability and capable of forming white images having a high whiteness.

These results suggest that titanium oxide particles, silicon dioxide particles, and aluminum oxide particles can be used as the inorganic particles (Db) in embodiments of the ink of the present invention. In particular, the use of titanium oxide particles as the inorganic particles (Db) much increases the whiteness of the film. This is probably because titanium oxide has a high refractive index and can act as a white pigment by itself.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A photo-curable ink comprising:
a first liquid containing a polymerizable compound and a photopolymerization initiator;
a second liquid which is incompatible with the first liquid; and
inorganic particles having a volume median diameter in the range of 5 nm to 100 nm,
wherein the second liquid is formed into droplets dispersed in the first liquid, and
wherein the inorganic particles are adsorbed on an interface between the first liquid and the second liquid.

2. The photo-curable ink according to claim 1, wherein the inorganic particles contain a metal oxide selected from the group consisting of silicon dioxide, aluminum oxide, and titanium oxide.

3. An ink cartridge comprising:
the photo-curable ink as set forth in claim 1; and
an ink compartment containing the ink.

4. An image forming method comprising:
applying the photo-curable ink as set forth in claim 1 onto a substrate; and
irradiating the photo-curable ink on the substrate with light.

5. The photo-curable ink according to claim 1, wherein the second liquid contains water.

6. The photo-curable ink according to claim 5, wherein the water content is in the range of 5% by mass to 50% by mass relative to the total mass of the photo-curable ink.

7. The photo-curable ink according to claim 1, wherein the droplets have a volume median diameter in the range of 0.1 μm to 20 μm.

8. The photo-curable ink according to claim 1, wherein the droplets have a volume median diameter in the range of 0.1 μm to 1 μm.

9. The photo-curable ink according to claim 1, wherein the polymerizable compound contains a radically polymerizable compound.

10. The photo-curable ink according to claim 9, wherein the radically polymerizable compound is a (meth)acrylic compound.

11. The photo-curable ink according to claim 1, wherein the solubility of water in 100% by mass of the polymerizable compound is in the range of 0.01% by mass to 2.0% by mass at 25° C.

12. The photo-curable ink according to claim 1, wherein the second liquid contains water.

13. The photo-curable ink according to claim 1, wherein the inorganic particles are titanium dioxide particles.

14. The photo-curable ink according to claim 1, wherein the inorganic particles have a volume median diameter in the range of 5 nm to 100 nm.

15. The photo-curable ink according to claim 1, the ratio (R/r) of the median diameter R of the droplets to the median diameter r of the inorganic particles is in the range of 5 to 400.

16. The photo-curable ink according to claim 1, wherein a part of the inorganic particles are dispersed in the first liquid.

17. The photo-curable ink according to claim 1, further comprising a surfactant.

18. The photo-curable ink according to claim 17, wherein the surfactant is a nonionic surfactant.

* * * * *